(12) United States Patent
Köpfer

(10) Patent No.: US 10,514,593 B2
(45) Date of Patent: Dec. 24, 2019

(54) OPTICAL IMAGE STABILIZER

(71) Applicant: ACTUATOR SOLUTIONS GMBH, Gunzenhausen (DE)

(72) Inventor: Markus Köpfer, Stoedtlen-Regelsweiler (DE)

(73) Assignee: ACTUATOR SOLUTIONS GMBH, Gunzenhausen (DE)

(*) Notice: Subject to any disclaimer, the term of this patent is extended or adjusted under 35 U.S.C. 154(b) by 0 days.

(21) Appl. No.: 16/336,402

(22) PCT Filed: Dec. 12, 2017

(86) PCT No.: PCT/IB2017/057839
§ 371 (c)(1),
(2) Date: Mar. 25, 2019

(87) PCT Pub. No.: WO2018/109659
PCT Pub. Date: Jun. 21, 2018

(65) Prior Publication Data
US 2019/0243216 A1   Aug. 8, 2019

(30) Foreign Application Priority Data

Dec. 13, 2016  (IT) .................. 102016000125596

(51) Int. Cl.
*G03B 17/04* (2006.01)
*G03B 5/02* (2006.01)
(Continued)

(52) U.S. Cl.
CPC .............. *G03B 17/04* (2013.01); *G03B 5/02* (2013.01); *G03B 2205/0015* (2013.01); *G03B 2205/0076* (2013.01)

(58) Field of Classification Search
None
See application file for complete search history.

(56) References Cited

U.S. PATENT DOCUMENTS

2014/0177056 A1* 6/2014 Hayashi ............ G02B 7/08
359/557
2016/0044232 A1 2/2016 Kim et al.
(Continued)

FOREIGN PATENT DOCUMENTS

EP           2 813 877        12/2014
WO   WO 2009/024839 A1    2/2009
(Continued)

OTHER PUBLICATIONS

International Preliminary Report on Patentability, issued in PCT/IB2017/057839, dated Nov. 27, 2018.
(Continued)

*Primary Examiner* — William B Perkey
(74) *Attorney, Agent, or Firm* — Birch, Stewart, Kolasch & Birch, LLP

(57) ABSTRACT

An Optical Image Stabilizer (OIS) system comprises three stacked frames (11, 12, 13) carrying an imaging system (14), the reciprocal movements of said frames (11, 12, 13) being translational movements orthogonal to each other and to the optical axis of the imaging system (14) and achieved and controlled by two couples of antagonistic shape memory alloy wires (16, 17).

22 Claims, 2 Drawing Sheets

Figure 1:
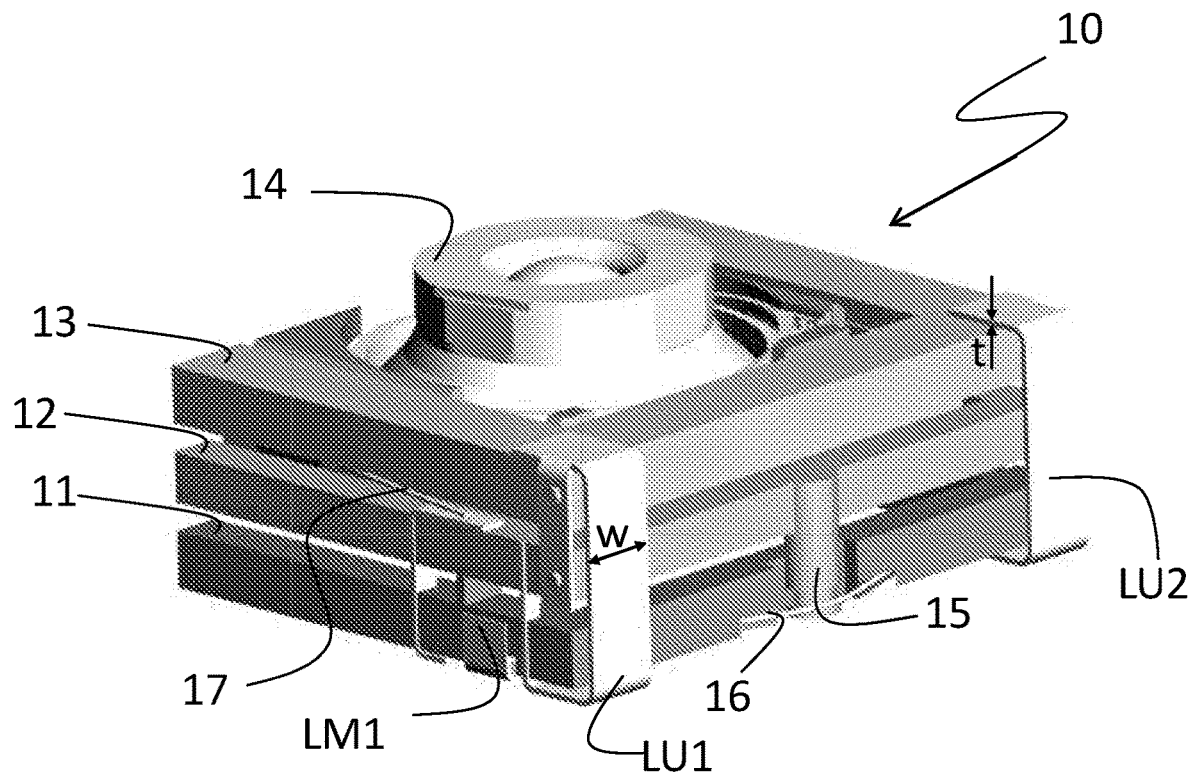

(51) Int. Cl.
*H04N 5/232* (2006.01)
*G02B 27/64* (2006.01)

(56) References Cited

U.S. PATENT DOCUMENTS

2017/0285443 A1* 10/2017 Hu .......................... F03G 7/065
2018/0031856 A1*  2/2018 Hosokawa ........... G02B 27/646
2018/0149142 A1*  5/2018 Bunting ................. F03G 7/065
2018/0321460 A1* 11/2018 Lee ........................ G02B 7/09

FOREIGN PATENT DOCUMENTS

WO    WO 2010/029316 A2    3/2010
WO    WO 2010/029316 A3    3/2010
WO    WO 2016/178152 A1   11/2016

OTHER PUBLICATIONS

International Search Report, issued in PCT/IB2017/057839, dated Jan. 26, 2018.
Written Opinion of the International Searching Authority, issued in PCT/IB2017/057839, dated Jan. 26, 2018.

* cited by examiner

OPTICAL IMAGE STABILIZER

Actuators based on Shape Memory Alloy (SMA) wires are becoming increasingly adopted due to the intrinsic advantages associated with this technology, in particular their capability to replace micro-motors offers advantages in terms of encumbrance, reliability, power consumption.

Their use is particularly appreciated in an Optical Image Stabilizer (OIS), especially for mobile phones applications, due to the increasing requirements on miniaturization and the need to minimize power consumption.

Some of the earlier technical solutions for controlling image stability in optical systems using SMA wires were based on tilting, such as the ones described in US 2001/0022688 and U.S. Pat. No. 8,848,064.

The major drawbacks of tilting solutions are described in paragraphs [0026]-[0028] of EP 2732331 and in brief are associated to difficulties in routing electrical connections from the moving image sensor to the fixed structure of the camera, and to the height and footprint of the OIS camera that must be greater than for an equivalent camera without OIS.

These drawbacks have led to the development of non-tilting (shift/translational) systems in which the SMA actuator wires are arranged substantially perpendicular to the OIS primary axis, such that they have a small extent perpendicular to said axis thus minimizing the system height. One of the problems associated with the use of SMA wires in such systems are the torque forces that either may affect the system output performances by causing a tendency for the movable element to rotate around its primary axis, or may impose additional stresses on the structure leading to its premature ageing, with consequent performance losses over time that in some cases may lead to premature failures. In EP 2732331 this problem is solved by means of non-collinear wires positioned in such a way as to cancel out the torque force components.

Another approach for incorporating and using SMA wires in OIS systems is described in WO 2016/178152 in the applicant's name, that discloses the use of an elastic structure suitable for the OIS application, with an elastic structural cage deformed under the action of SMA wires. A different solution showing a deformation of the OIS structural frame is also disclosed in US 2015/0322929.

Purpose of the present invention is to provide, differently from what disclosed in WO 2016/178152, a rigid structure for an OIS system that does not suffer from the problems associated with tilting and with torque force components management, and in a first aspect thereof consists in an optical image stabilizer comprising three stacked frames, namely a lower frame, a middle frame and an upper frame, said upper frame being suitable to firmly hold one or more imaging systems, wherein each stacked frame is connected to at least another frame by means of at least four flexible elements, the middle and upper frames being slidably movable with respect to the lower frame, wherein the movements of said middle and upper frames are orthogonal to each other and to the optical axis of the imaging system(s), each of said orthogonal movements being controlled by a couple of antagonistic shape memory alloy wires.

Figure 2:
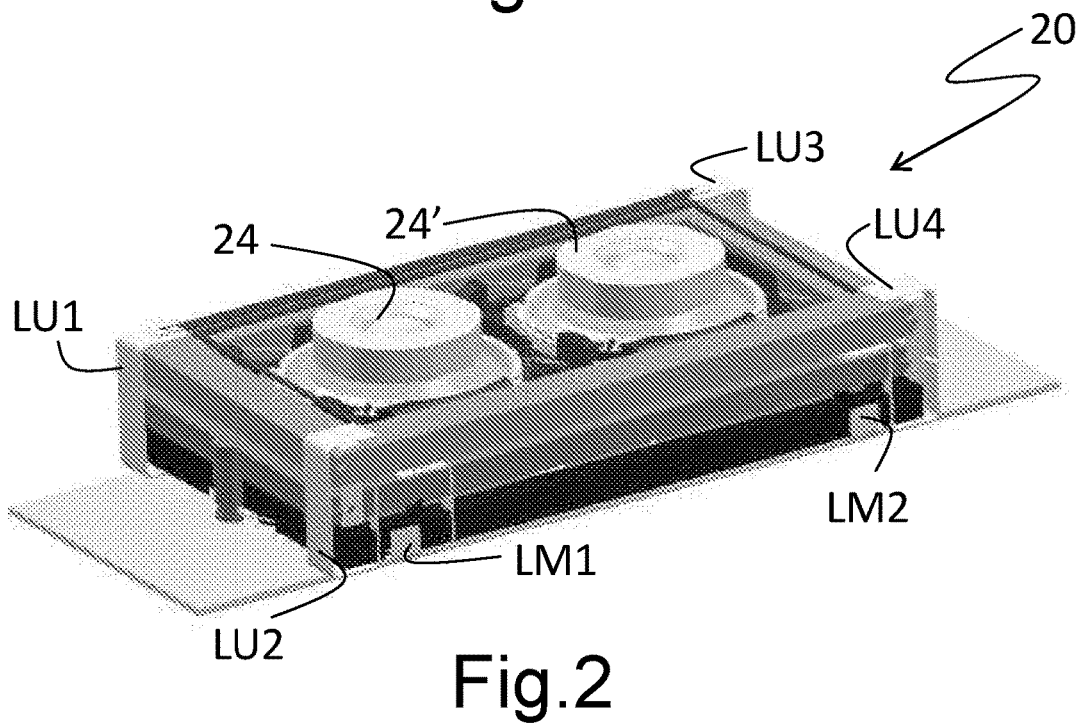
Figure 3A:
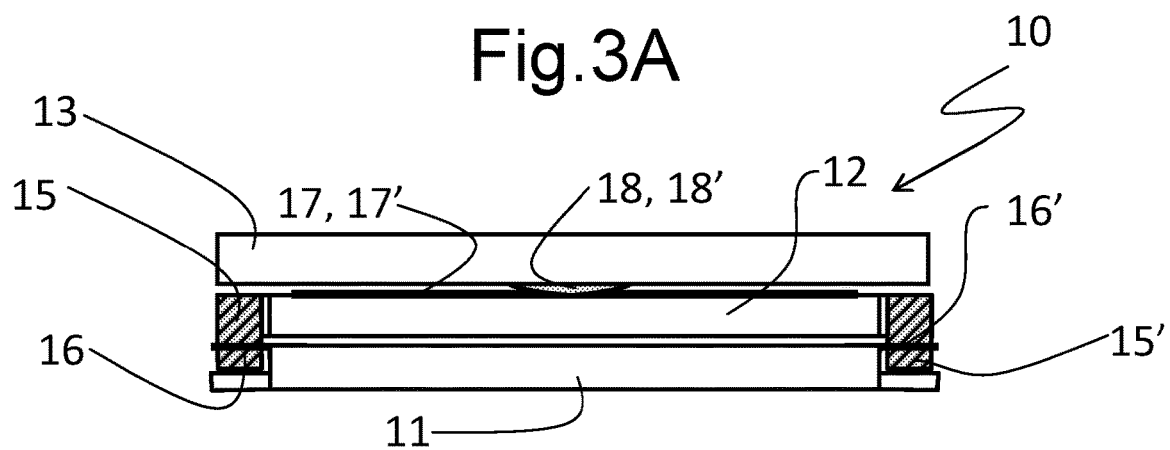
Figure 3B:
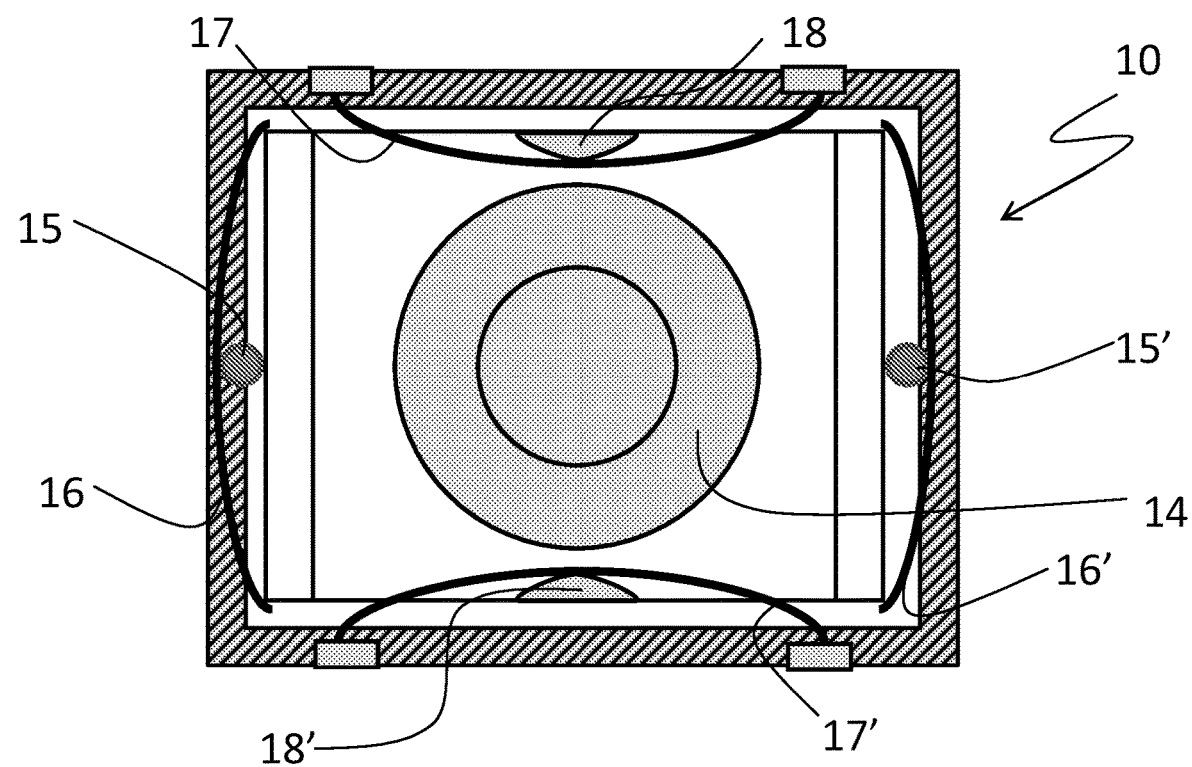

The invention will be further described with the help of the following figures, wherein:

FIG. 1 is a perspective view of a camera module incorporating an OIS according to the present invention and an integrated imaging system, FIG. 2 is a perspective view of a camera module incorporating an OIS according to the present invention and two integrated imaging systems, FIGS. 3A and 3B are diagrammatic sectional views, respectively frontal (3A) and from above (3B), of the camera module of FIG. 1, said views specifically highlighting the placements and roles of the antagonistic SMA wires.

In the above figures, dimensions and dimensional ratios may not be correct but in some cases have been altered in order to improve the figure readability; also, elements not essential for the understanding of the invention, for example the SMA wires connections and fixings, usually have not been depicted since ancillary and widely known in the technical field.

FIG. 1 shows a perspective view of a camera module 10 comprising an optical image stabilizer (OIS) according to the present invention. Imaging system 14 of camera module 10 is firmly fixed on the OIS that comprises a lower frame 11, a middle frame 12 and an upper frame 13, vertically stacked. Lower and upper frames 11, 13, are connected by means of four flexible elements LU (Lower-Upper), only two elements LU1 and LU2 being shown in the perspective view, while lower and middle frames 11, 12 are connected by means of four flexible elements LM (Lower-Middle), only one element LM1 being shown in the perspective view. In this embodiment the middle frame 12 has two downward projections 15, 15' located on opposing sides, only one downward projection 15 being visible in the perspective view. Each projection 15, 15' extends downwards to the bottom of the OIS passing through a suitable recess formed in the lower frame 11.

The reciprocal and purely translational movements of the frames, orthogonal to the optical axis of the imaging system 14, are provided by two couples of antagonistic SMA wires 16, 16' and 17, 17' in arcuate or V-shape configurations, only one element 16, 17 for each couple being shown in the perspective view.

In particular the extremities of wires 16, 16' are fixed onto lower frame 11 and wires 16, 16' act on middle frame 12 via the downward projections 15, 15' that have a groove as retaining element for engaging the central portions of wires 16, 16'. Similarly, the extremities of wires 17, 17' are fixed onto middle frame 12 and their central portions act on upper frame 13 through downward projecting hooks 18, 18' integral therewith as retaining elements (not visible in this view). It is convenient for the SMA wires 16, 16' and 17, 17' in the arcuate or V-shape configuration to have their extremities connected at points that are equally distant from the central portion retaining element (i.e. the groove and the hook, in this embodiment).

The flexible elements LU, LM connecting the vertically stacked frames have both the function of holding the frames in position and of allowing for their translational movements when they are pulled by the activated (heated) SMA wires.

FIG. 2 shows a perspective view of a camera module 20 comprising two imaging systems 24, 24', this figure being representative of what may be used in dual camera cellular phones. With respect to FIG. 1, FIG. 2 allows to appreciate and observe all four LU flexible connecting elements LU1, LU2, LU3, LU4 and two of the four LM flexible connecting elements LM1, LM2.

Even though the invention is in principle not limited to the number of imaging systems installed, the most useful configuration envisions the use of one or two imaging systems. In a preferred embodiment the imaging systems mounted on the camera module have their own auto-focus function embedded therein, such auto-focus function being controlled independently from the OIS control function, whereas the OIS function is achieved and controlled through the present invention.

Generally speaking the flexible connecting elements are geometrically characterized by their width w and thickness t as indicated in FIG. 1. Their length is mainly determined by their vertical extension between the frames they are connecting, plus the short horizontal end portions. Therefore the flexible connecting element elements LU will be longer then the flexible connecting elements LM, since the latter connect adjacent frames whereas elements LU connect the lower and upper frames. Preferably the thickness t of the flexible connecting elements is comprised between 0.05 and 0.15 mm, while their width w is comprised between 0.3 and 0.5 mm. As a consequence, the flexible elements (LU, LM) have a width/thickness ratio (w/t) comprised between 10:1 and 2:1, most preferably about 4:1.

In the preferred embodiment shown in FIGS. 1 and 2, there are four flexible elements LU that connect the four corresponding corners of the lower and upper frames, the frame sides on which said flexible elements are arranged being defined as LU sides, while the lower and middle frames are connected by means of four flexible elements LM that connect corresponding portions of the lower and middle frames, the frame sides on which said flexible elements LM are arranged being defined as LM sides, where the LM sides are preferably adjacent to the LU sides (this means that preferably the LU and LM flexible elements are not on the same frame side).

It has to be underlined that FIGS. 1 and 2 show specific non-limiting embodiments according to the present invention, for example additional flexible elements may by placed along the frame sides; the use of such additional flexible elements is preferable in case of double camera systems, to take into account the bigger system length necessary to accommodate two separate and adjacent imaging systems as in FIG. 2. Another variation may encompass upward projections 15, 15' from the middle frame 12 instead than downward ones.

The cross-sectional views of FIGS. 3A, 3B of the camera module 10 show the positioning of the antagonistic SMA wires couples, 16-16', 17-17'. Separation and reciprocal positioning of couple 16-16' are observable both in the frontal view of FIG. 3A (in which the imaging system 14 is omitted for clarity) and in the view from above of FIG. 3B, while the reciprocal positioning of antagonistic wires 17-17' is observable only in FIG. 3B.

Projections 15, 15' extending downward from the middle frame 12 are engaged by SMA wires 16, 16', while anchoring elements 18, 18' formed on the upper frame 13 are engaged by wires 17, 17' allowing for the position control of imaging system 14 through translational movements of the OIS stacked frames.

An OIS system according to the present invention is therefore exemplified in FIGS. 1, 2, 3A and 3B, the presence of the imaging systems 14, 24, 24' being added in those figures only to improve the understanding and operation of the OIS itself.

In a preferred embodiment the flexible elements are also the anchoring points for the extremities of the SMA wires and are made of a bendable conducting material so as to be able to supply the current to actuate the SMA wires. Therefore the flexible elements are essentially made with bendable metal or with bendable plastic comprising an electrically conducting element, such as a metal stripe, to supply the activation current to the SMA wires.

With the term flexible/bendable it is intended a material having the capability to be subject to a lot of deformation cycles without breaking, for this reasons materials with a Young modulus in the range 1-100 GPa are preferably used.

In the illustrated embodiment, the lower frame 11 or the upper frame 13 has two connection points for the extremities of the SMA wires 16, 16' in correspondence of the terminal portion of each middle frame projection 15, 15', such connection points being at the same distance from the center of the projections 15, 15'. In the perspective views of FIGS. 1 and 2, the projections extend downwards from the middle frame 12, so it is the lower frame 11 that has the SMA wire extremities connection points.

In another embodiment the middle frame 12, on the sides adjacent to the sides having the downward or upward projections 15, 15', has two connection points for the two antagonistic SMA wires 17, 17', while the SMA wire central portion is engaged onto a different frame, i.e. the one opposed to the projection direction. In the perspective views of FIGS. 1 and 2, the projection 15 extends downward and therefore the SMA wires 17, 17' connecting the middle frame 12 and the upper frame 13 have their central portions engaged onto the upper frame 13 by means of suitable retaining elements, such as hooks 18, 18' (FIG. 3B).

The SMA wires used in the OIS according to the present invention are not restricted to a specific type, but any SMA wires activated by Joule effect may be usefully employed. Having said that, preferred is the use of SMA wires made with Ni—Ti alloys widely known in the field with the name of Nitinol, with diameters ranging from 10 µm to 50 µm and commercially available from a variety of sources, for examples the wires sold under the tradename of Smartflex by SAES Getters S.p.A, with particular preference for the use of 25 µm wires.

With regards to the way to operate and control antagonistic wires, this information is known to a person of ordinary skill in the art, see for example the paper "An accurately controlled antagonistic shape memory alloy actuator with self-sensing" by Wang et al., published in 2012 in Sensors, 12, 7682-7700.

The invention claimed is:

1. An optical image stabilizer comprising three stacked frames, namely a lower frame (11), a middle frame (12) and an upper frame (13), said upper frame (13) being suitable to firmly hold one or more imaging systems (14; 24, 24'), wherein each stacked frame (11, 12, 13) is connected to at least another stacked frame (11, 12, 13) by means of at least four flexible elements (LM, LU), said middle (12) and upper frames (13) being slidably movable with respect to said lower frame (11), wherein the movements of the middle (12) and upper frames (13) are orthogonal to each other and to the optical axis of the imaging system(s), said orthogonal movements being controlled each by a couple of antagonistic shape memory alloy wires (16, 16'; 17, 17') that engage retaining elements formed on the frames (11, 12, 13) on opposing sides thereof.

2. An optical image stabilizer according to claim 1, wherein the middle frame (12) on two opposing sides has two vertical projections (15, 15'), one for each opposing side, with a retaining element in the terminal portion of each of said projections (15, 15') suitable to engage the central portion of a shape memory alloy wire (16, 16'; 17, 17').

3. An optical image stabilizer according to claim 2, wherein the lower frame (11) has two connection points for the extremities of a shape memory alloy wire (16, 16') on each of the sides in correspondence of the vertical projections (15, 15'), such connection points being at the same distance from the center of the vertical projections (15, 15').

4. An optical image stabilizer according to claim 2, wherein the middle frame (12), on each of the sides adjacent to the sides where the vertical projections (15, 15') are formed, has two connection points for the extremities of a shape memory alloy wire (17, 17').

5. An optical image stabilizer according to claim 2, wherein the vertical projections (15, 15') are directed downwards toward the lower frame (11) or upwards toward the upper frame (13).

6. An optical image stabilizer according to claim 4, wherein the upper frame (13) or the lower frame (11), on each of the sides adjacent to the sides where the vertical projections (15, 15') of the middle frame (12) are formed, has a retaining element (18, 18') extending respectively downwards or upwards and suitable to engage the central portion of a shape memory alloy wire (17, 17'), the connection points being at the same distance from the center of the retaining elements (18, 18').

7. An optical image stabilizer according to claim 1, wherein the flexible elements (LM, LU) are made with a material having a Young modulus in the range 1-100 GPa.

8. An optical image stabilizer according to claim 7, wherein the flexible elements (LM, LU) are made with a bendable metal or with a bendable plastic comprising an electrically conducting element.

9. An optical image stabilizer according to claim 8, wherein at least two of said flexible elements (LM, LU) are also the anchoring points for the extremities of the shape memory alloy wires (16, 16'; 17, 17').

10. An optical image stabilizer according to claim 1, wherein four flexible elements (LU) connect four corners of the lower frame (11) and the upper frame (13), said flexible elements (LU) being placed in pairs on two opposing sides of the lower frame (11) and the upper frame (13).

11. An optical image stabilizer according to claim 10, wherein four flexible elements (LM) connect four corners of the lower frame (11) and the middle frame (12), said flexible elements (LM) being placed in pairs on two opposing sides of the lower frame (11) and the middle frame (12) that are adjacent to the sides where the flexible elements (LU) that connect the lower frame (11) and the upper frame (13) are placed.

12. An optical image stabilizer according to claim 1 wherein the flexible elements (LU, LM) have a thickness (t) between 0.05 and 0.15 mm.

13. An optical image stabilizer according to claim 1 wherein the flexible elements (LU, LM) have a width (w) between 0.3 and 0.5 mm.

14. An optical image stabilizer according to claim 1 wherein the flexible elements (LU, LM) have a width/thickness ratio (w/t) between 10:1 and 2:1.

15. A camera module (10; 20) comprising an optical image stabilizer according to claim 1 and one or two imaging systems (14; 24, 24').

16. A camera module according to claim 15, wherein each imaging system (14; 24, 24') has its own embedded and independently controlled autofocus function.

17. An optical image stabilizer according to claim 3, wherein the middle frame (12), on each of the sides adjacent to the sides where the vertical projections (15, 15') are formed, has two connection points for the extremities of a shape memory alloy wire (17, 17').

18. An optical image stabilizer according to claim 3, wherein the vertical projections (15, 15') are directed downwards toward the lower frame (11) or upwards toward the upper frame (13).

19. An optical image stabilizer according to claim 4, wherein the vertical projections (15, 15') are directed downwards toward the lower frame (11) or upwards toward the upper frame (13).

20. An optical image stabilizer according to claim 5, wherein the upper frame (13) or the lower frame (11), on each of the sides adjacent to the sides where the vertical projections (15, 15') of the middle frame (12) are formed, has a retaining element (18, 18') extending respectively downwards or upwards and suitable to engage the central portion of a shape memory alloy wire (17, 17'), said retaining element (18, 18') being shaped like a hook, the connection points being at the same distance from the center of the retaining elements (18, 18').

21. An optical image stabilizer according to claim 2, said retaining element being a groove.

22. An optical image stabilizer according to claim 6, said retaining element (18, 18') being shaped like a hook.

\* \* \* \* \*